Patented Nov. 19, 1935

2,021,131

UNITED STATES PATENT OFFICE 2,021,131

COATING COMPOSITION

Omer McDaniel, Toledo, Ohio, assignor to Mountain Varnish & Color Works, Inc., Toledo, Ohio, a corporation of Delaware No Drawing. Application April 22, 1932, Serial No. 606,911

2 Claims. (Cl. 167—90)

This invention relates to protective agent and more particularly to a composition adapted for the protection of organic tissues against any and all foreign matter, including, among others, injurious elements such as acid fumes, printer's ink, gasoline, or other naptha distillates, grease, oils, paints, varnishes, lacquers and enamels, as well as other materials which may adhere to the skin and which sometimes result in the hardening or cracking of the skin or in sealing or filling the pores thereof.

The invention comprehends the provision of a protective coating material particularly usable as a protective skin coating having constituents which substantially prevent other foreign matter from entering the pores of the tissues and which provides a drying filler for the pores in the form of a film coating having no deleterious effects on the tissues.

The invention embraces the use of a protective agent which will substantially prevent to a large extent the adhesion and absorption by the skin pores of various foreign matters, such as are encountered by painters and mechanics and the like in carrying on the ordinary duties of their professions wherein the hands or other portions of body tissues become normally coated with foreign matter which may have corrosive or deleterious effects upon the skin tissue normally requiring the employment of abrasives or detergents in order to remove the foreign matter. The provision of a coating material of my invention enables the skin tissue or other coated surfaces to be cleansed quickly and easily through the use of either hot or cold water or other cleansing fluids.

A further object of the invention resides in the application and use of a protective coating, which, when rubbed into the skin tissue substantially closes the pores thereof by forming a film thereover and when allowed to dry permitting work to be performed without hindrance. The persons' hands when coated with the protective material may encounter various foreign matters which may adhere to the coating on the skin, but when the skin is cleansed the protective coating leaves no greasy effect on the skin nor does the same render them slippery and scaly, and soreness of the skin will not result through the use of the protective material of my invention.

Still a further object of the invention is the provision of a simple and inexpensive protective coating particularly adapted for the skin having definite prophylactic and antiseptic properties.

With these and other objects in view, the invention comprises the various features hereinafter described and explained and more particularly defined in the claims.

While the coating composition of my invention has particular utilization when applied to organic tissues such as skin tissue as a protective coating therefor, it is to be understood that its use is not so limited but that I contemplate its use as a protective coating wherever the same may be found to be applicable.

In my present invention a protective coating composition is formed by admixing various constituents or elements following a method hereinafter described in a manner rendering all the elements substantially miscible whereby certain novel properties and advantageous results are obtained.

In one form of the invention I preferably employ as a basic constituent a saponaceous solution preferably formed of by utilizing an alkaline salt of a fatty acid dissolved in water, heated preferably to the boiling point of water, adding thereto sodium silicate while the mixture is in constant agitation forming a gelatinous composition. While the admixture is in the process of preparation of the gelatinous structure, an alcohol of the poly-hydroxy series such as glycerine is added, as well as a desirable synthetic masking oil.

As a practical embodiment of my invention I preferably employ as a basic constituent a saponaceous solution, and I have found that the following proportions of elements by weight give very advantageous results. The saponaceous solution having desirable characteristics preferably comprises substantially 1600 parts of water in which is dissolved substantially 288 parts of a saponaceous material, as for example, sodium stearate. For practical use, I have employed ordinary soap flakes for this purpose having a major content of sodium stearate, although other saponaceous materials may be employed without departing from the spirit and scope of this invention. This solution is preferably formed by melting the soap flakes or sodium stearate in the water then preferably brought to substantially the boiling point, this heat being sufficient to melt the soap causing the same to dissolve in the water.

To this admixture is added substantially 906 parts of sodium silicate while the saponaceous solution is still in heated condition. It is desirable, when adding the sodium silicate to thoroughly agitate or stir the solution until the desired thickening of the admixture or gelatinous condition has been attained. To this mixture is then added substantially 1155 parts of a poly-hydroxy alcohol, as for example, glycerine. The agitation or stirring of the mixture during the addition of the glycerine is carried on until the resulting solution or admixture is cold or reaches a normal atmospheric temperature. The visual physical characteristics of the admixture, upon cooling, has the appearance of a white creamy-like substance resembling cold cream.

It is desirable to add to the admixture a small quantity of suitable synthetic masking oil to render the mixture pleasantly odoriferous and I have found that the addition of 1 part of lemenone or suitable extract of lemon fulfills the function of lending a pleasant odor to the admixture.

The production of a protective coating material of the character above described is inexpensive to manufacture and fulfills all the characteristics desired in preventing cohesion of foreign matter to the skin tissues acting in this manner as an effective protective material. The addition of sodium silicate lends to the mixture sealing qualities for closing the pores in the skin tissues and the glycerine in conjunction with the saponaceous material having antiseptic and prophylactic properties, the glycerine per se also serving the added purpose of keeping the coating material soft and pliable when the same dries on the skin. In this manner the glycerine also prevents the cracking of the coating which normally would destroy its sealing qualities.

In the use of the material, the person applies a comparatively thin coating of the same to the skin parts to be protected from foreign matter so that the foreign materials which would normally come in contact with the skin collect upon the coating film. When it is desired to cleanse the hands of the impurities or foreign matter, it is found that the foreign matter, including the film of coating material is washed away readily by either hot or cold water, leaving the skin soft and pliable, the glycerine in the solution particularly having benefit in preventing the drying and cracking of the skin and other ill effects which might otherwise result in the constant application of an alkaline mixture.

It is to be understood that various changes or modifications may be made in the proportions of constituents used and materials employed and in the method of fabricating the admixture above described without departing from the spirit or scope of the invention as defined in the claims and that the mixture above described is to be interpreted as illustrative of a preferred embodiment of my invention.

What I claim is:

1. A skin protecting coating composition which dries to a soft, pliable film, said composition consisting of a saponaceous solution comprising substantially 1600 parts by weight of water and 288 parts by weight sodium stearate, 1155 parts by weight glycerine, and 906 parts by weight sodium silicate, and substantially one part by weight lemenone.

2. A skin protective coating composition which dries to a soft, pliable film, said composition consisting of a saponaceous solution comprising substantially 1600 parts by weight of water and 288 parts by weight sodium stearate, 1155 parts by weight glycerine, and 906 parts by weight sodium silicate.

OMER McDANIEL.